United States Patent
Dreyer

[15] 3,693,997
[45] Sept. 26, 1972

[54] ADJUSTABLE STEERING COLUMN FOR MOTOR VEHICLES

[72] Inventor: Hans Dreyer, Russelsheim, Germany

[73] Assignee: General Motors Corporation, Detroit, Mich.

[22] Filed: March 5, 1971

[21] Appl. No.: 121,349

[30] Foreign Application Priority Data

March 11, 1970 Germany..........P 20 11 606.7

[52] U.S. Cl....................280/87 A, 74/493, 296/146
[51] Int. Cl. .............................................B62d 1/18
[58] Field of Search ........280/87 A; 74/493; 296/146

[56] References Cited
UNITED STATES PATENTS 2,770,981  11/1956  Fieber.........................74/493
3,412,629  11/1968  Hill............................74/493

FOREIGN PATENTS OR APPLICATIONS

872,026  5/1942  France....................280/87 A

Primary Examiner—Benjamin Hersh
Assistant Examiner—John A. Pekar
Attorney—D. L. Ellis and W. E. Finken

[57] ABSTRACT

This invention relates to an adjustable steering column for a motor vehicle in which the position within the vehicle of a steering wheel attached to the upper end of the steering column can be readily adjusted by adjusting the overall length and the inclination of the adjustable steering column.

9 Claims, 8 Drawing Figures

ADJUSTABLE STEERING COLUMN FOR MOTOR VEHICLES

This application discloses an adjustable steering column in which an upper portion of the column can be adjusted axially for length and can be swung upwards or downwards through a circular arc relative to a lower fixed portion of the column to adjust for inclination by means of at least one extensible link system, such that the overall length and the inclination of the steering column can be adjusted simultaneously, the extensible link system having locking means whereby it is locked and unlocked by the movement of a simple manual control adjacent a steering wheel attached to the upper portion of the column.

A preferred embodiment of the invention, described in detail in the application, and for use in a motor vehicle in which the windscreen and forward portion of the roof are formed as a single canopy of glass hinged at its forward edge to the bonnet of the vehicle, comprises an adjustable steering column in which the extensible link system for adjusting the length and the inclination of the column is also connected to the lifting mechanism for the glass canopy so that, as the glass canopy is raised to allow access to the passenger compartment of the vehicle, the steering column is inclined away from the vehicle driving seat, and vice versa.

This invention relates to adjustable steering columns for motor vehicles which have an upper steering column portion pivotally connected about a horizontal axis to a lower steering column portion, upper and lower steering shaft portions which are rotatably mounted in the respective upper and lower steering column portions and are connected together by a universal joint, the upper steering shaft portion consisting of two parts axially telescoping into each other.

U.S Pat. No. 3,245,282 makes known a locking device for such adjustable steering columns which prevents not only the movements of a swivelling steering column portion but also those of a telescopically movable steering shaft portion.

With the known steering column construction disclosed in this specification however, the pivoting facility is limited because the pivotal axis for the upper steering column is very closely adjacent to the steering wheel. At a certain angular displacement, the possible height adjustment of the steering wheel is thereby made relatively small.

From U.S. Pat. No. 3,258,987 it is known to arrange the pivotal axis for the adjustment of the upper steering column portion at a greater distance from the steering wheel and to arrange the telescopic adjustment section of the steering shaft between this pivotal axis and the steering wheel. With this arrangement of adjustable steering column however, a separate locking device is necessary for locking the telescopically movable steering column portion, as well as for locking the pivotable steering column portion. Adjustment of the steering column is rendered difficult due to the fact that either two release elements have to be operated smultaneously, or the adjustments have to be carried out successively first in the axial direction and then in the plane of swivelling.

The invention is concerned with a construction of adjustable steering column which makes it possible to utilize a single locking (and release) member for the simultaneous adjustment of the steering wheel of the vehicle with regard to both pivotal movement of the upper portion of the steering column about a horizontal axis as well as displacement in an axial direction by relative telescopic movement of the pair of upper steering shaft portions.

A preferred embodiment of the invention, described in detail hereinafter relates to a vehicle in which a hinged upper body portion can be swung upwards about a pivotal axis lying in the forward area of the vehicle in order to facilitate entry and exit to the vehicle. In this vehicle, the adjustable steering column is so constructed that the steering column swings upwards when the upper body portion is lifted, and is brought back again into its normal working position when the body portion is folded down or closed.

An adjustable steering column for a motor vehicle according to the invention comprises a fixed lower steering column portion, an upper steering column portion, a horizontal transversely extending fixed pivot axis carried by said fixed lower steering column portion, means mounting said upper steering column portion for pivotal movement about said fixed pivot axis and for displacement in a direction radially of said axis, a two-part telescopic upper steering shaft portion, means rotatably mounting said column portion, a lower steering shaft portion, means rotatably mounting said lower steering shaft portion within said lower steering column portion, articulated joint means pivotally interconnecting said upper and lower steering shaft portions for the transmission of steering torque therebetween, at least two members forming an extensible link system, means mounting said extensible link system for pivotal movement about said fixed axis, means pivotally connecting said extensible link system to said upper steering column portion, a reaction member associated with said fixed pivot axis, and locking arrangement means selectively operable to lock at least one member of said extensible link system to said reaction member to thereby prevent both said pivotal movement and said displacement of the upper steering column portion.

With the link system unlocked, a simple pivoting movement of the steering wheel through a circular arc about the fixed pivot axis results in the upper steering column portion together with the link system pivoting as one constructional unit. At the same time, the link system retains its position with respect to the pivoted steering column portion exactly.

If on the other hand, while the link system is unlocked, the upper steering shaft portion (and therefore the associated steering wheel) is axially displaced then the link system changes its position with respect to the upper steering column portion Preferably the adjustable steering column according to the invention is one in which there are at least two extensible link systems, co-operating with each other, each comprising a rigid crank member and a rigid connecting rod, arranged symmetrically with respect to the upper steering shaft portion with one link system above the steering column and the other one below the steering column, the common hinge pivot between the crank member and the connecting rod in each link system being lockable in a plurality of predetermined positions situated radially of the fixed pivot axis.

In a preferred embodiment of the invention, the column is stabilized against tilting by using four extensible link systems which co-operate to support the upper portion of the steering column, the extensible link systems being arranged in two sets of two extensible link systems symmetrically placed with respect to the upper steering shaft portion, the two sets of extensible link systems being pivoted about two fixed spindles having the same axis, one spindle being on one side of a universal joint between the upper and lower steering shaft portions of the steering column, and the other spindle being on the other side of this universal joint.

The steering-wheel-side extremity of the stationary lower steering column portion includes a forked, box-like housing in which the extensible link systems are pivotally mounted on stub spindles, while an apertured disc is pivotally mounted in each case on these stub spindles at either side of the center longitudinal plane of the steering column.

The common hinge pivots of the extensible link systems can be locked into position relative to these apertured discs by means of spring-loaded detent pins provided upon the common hinge pivots and releasably engageable with the apertures of the apertured discs.

A particularly appropriate and advantageous construction of the connecting rods of the extensible link systems in the preferred embodiment is obtained when the two upper connecting rods form the side walls of a channel beam of U-shaped cross-section and the two lower connecting rods form the side walls of another channel beam of U-shaped cross-section.

In the case of a vehicle provided with an upper body portion swinging upwards about a forwardly disposed horizontal pivoting axis, the apertured discs are supported by push rods which connect the apertured discs with levers arranged torsionally fast on the pivot of the upper body portion.

In order that the upper steering column portion-particularly the telescopically displaceable steering shaft parts — may be satisfactorily guided and kept as free as possible from bending loads, a further feature of the invention resides in the fact that at either side of the steering column, guide bars are pivotally mounted on the stub spindles. These guides bars are each provided with a longitudinal slot in which the upper steering column portion is guided with two mutually spaced pivots secured to it.

In order to release the locking pins engaging in their respective apertures in the apertured discs, according to a further feature of the invention, use is made of a pair of Bowden cables which are spring-loaded. These Bowden cables pass in proximity to the steering wheel so that the locking pins can be withdrawn by operating manually a lever adjacent the steering wheel.

In order to attain weight compensation for the upper steering column portion — on the one hand so that in the unlocked condition the steering column or the steering wheel can be moved without great expenditure of effort and on the other hand so that when the steering column is locked, the pins can be relieved from the weight of the steering column — the weight of the upper steering column portion is compensated by two spiral springs arranged on the stub spindles in the casing of the lower steering column portion. Here the inner end of each of the spiral springs is connected to the respective stub spindle and the outer end is engaged to the respective guide bar.

The appended claims define the scope of the invention claimed. The invention and how it may be performed are hereinafter particularly described with reference to the accompanying drawings, in which:

Figure 1:
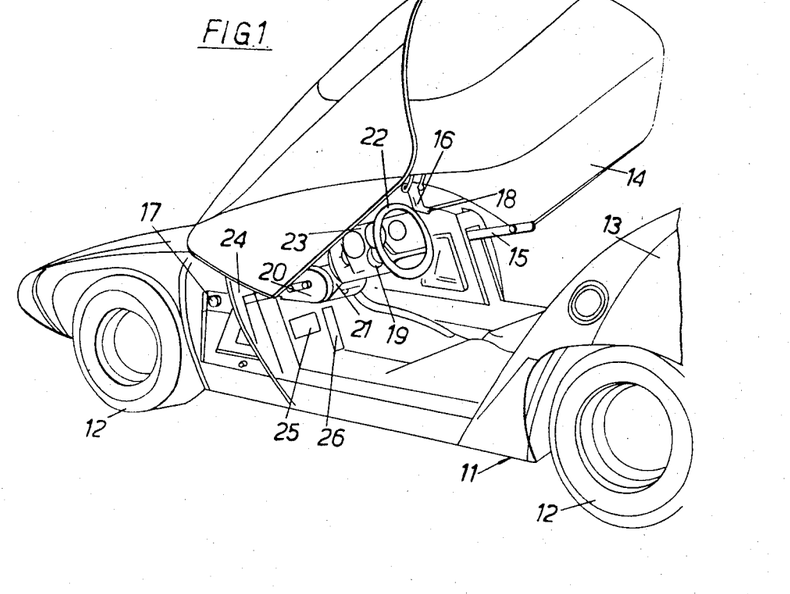
FIG. 1 is a partial view of a motor vehicle as seen from the left and from behind, and showing an upper body portion swung upwards about a transverse axis located in the forward area of the vehicle.

In FIG. 1, a motor vehicle 11 has wheels 12 and a body 13, the upper body portion 14 of which body consists entirely or partially of glass and can be swung upwards about a forward-placed pivotal axis by means of pairs of links 15/16 arranged at either side of the body 13. This upswinging action of the upper body portion 14 produces a very wide opening which very greatly facilitates entry and exit to the passenger compartment of vehicle 11, particularly in the case of vehicles having a very low body height. The pivots 17 and 18 of the link pairs are arranged in a front panel 24 of the body 13.

A steering column 19 has a stationary lower portion 20 and an adjustable upper portion 21 whose extremity carries a steering wheel 22 secured to the steering shaft in the usual manner. An instrument panel 23 is an enclosed constructional unit mounted on the steering column 19 so that during any adjustment of the position of the steering wheel 22, the panel 23 retains its position with respect to the steering wheel 22.

In a manner which will be described in still greater detail hereinafter, the adjustable upper portion 21 of the steering column 19 is coupled with a lower pivot 17 of the upper body portion 14 in such a way that, when this portion 14 is swung upwards or downwards, the upper portion of the steering column 21 is likewise swung upwards or downwards.

Pedals 25, 26 are mounted on a front panel 24.

Figure 2:
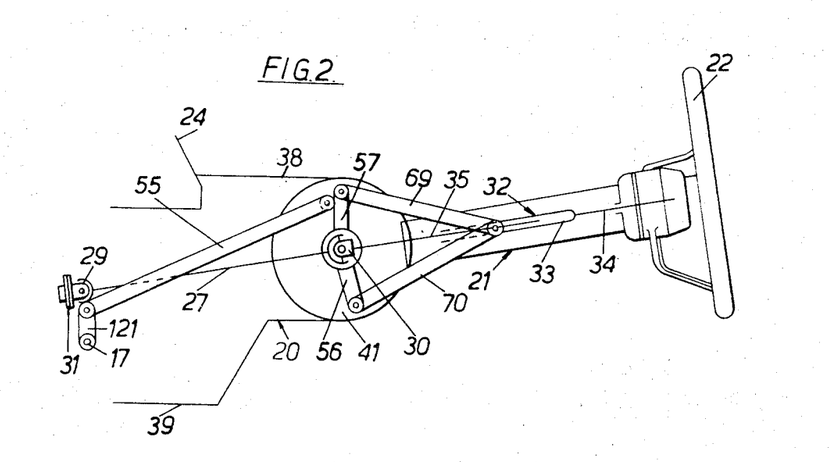
FIG. 2 is a side elevation of the steering column in a schematic presentation.
Figure 3:
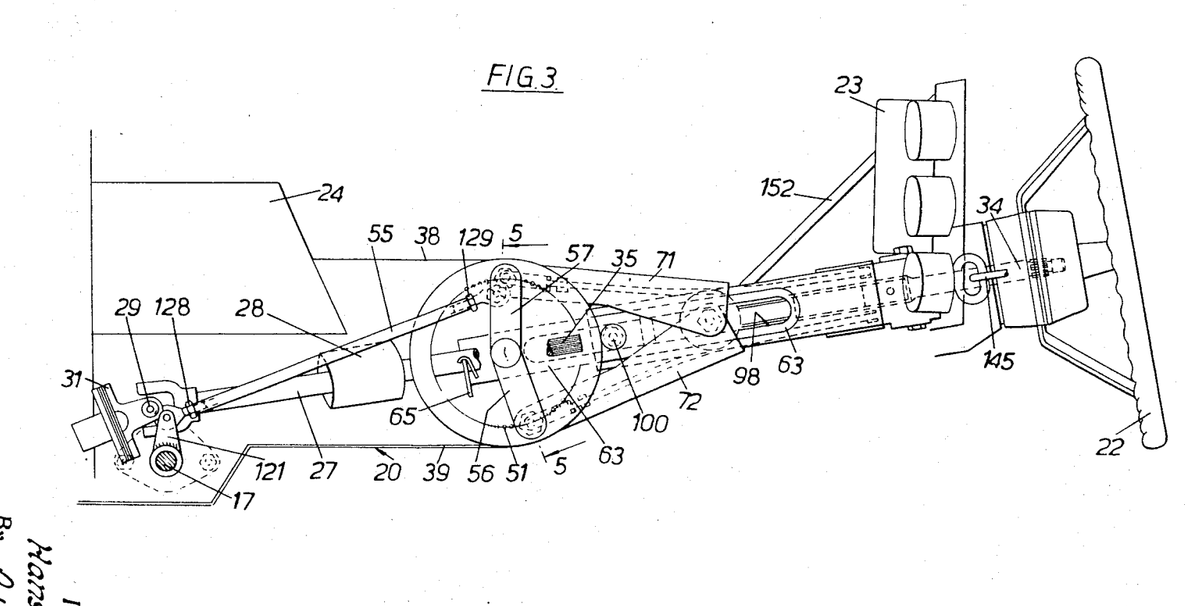
FIG. 3 is a side elevation of the steering column, shown partly in section.
Figure 4:
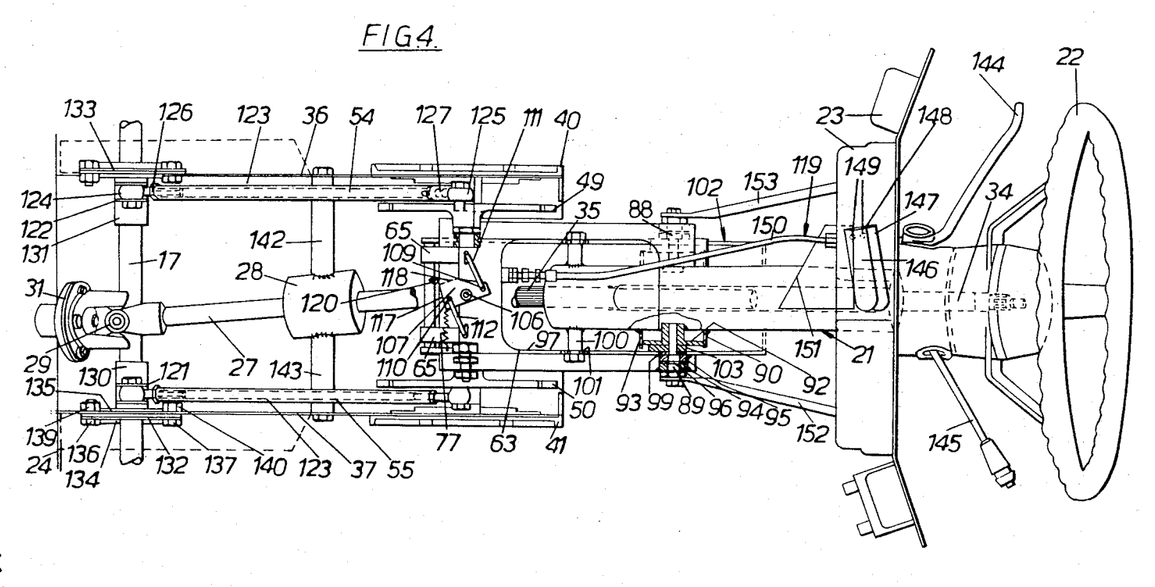
FIG. 4 is a plan of the steering column with the upper cover plates removed.

As FIGS. 3 and 4 illustrate and FIG. 2 indicates schematically, a lower steering shaft portion 27 is mounted by means of a bearing 28 in the lower steering column portion 20 connected to the front panel 24. At its bottom end and top end, this steering shaft portion 27 is provided with a universal joint, 29 and 30 respectively. In the interests of lucidity, the universal joint 30 is omitted from FIGS. 3 and 4. The lower shaft portion 27 is connected by a flexible coupling 31 to another shaft portion (not shown) on to the steering gear for the front wheels of the vehicle 11. A telescopically designed two-part steering shaft portion 32 is mounted in the upper steering column portion 21. The upper portion of this steering shaft portion is formed as a tube 33 whose top end is provided with a splined shank portion 34 on which the steering wheel 22 is mounted torsionally fast in the usual manner.

By means of the usual spline-shaft toothing, a stub shaft 35 is guided longitudinally displaceable but rotatively fast, in the tubular portion 33. By means of the universal joint 30, shown in FIG. 2, this stub shaft 35 is connected to the shaft portion 27 arranged in the lower steering column portion 20.

The lower steering column portion 20 is provided with two lateral cheeks 36, 37 (FIG. 4). The space lying between the cheeks is closed by an upper cover plate 38 with which the steering column portion 20 is connected with the front panel 24 of the body, and by a lower cover plate 39 which likewise is connected to the front panel 24.

Figure 5:
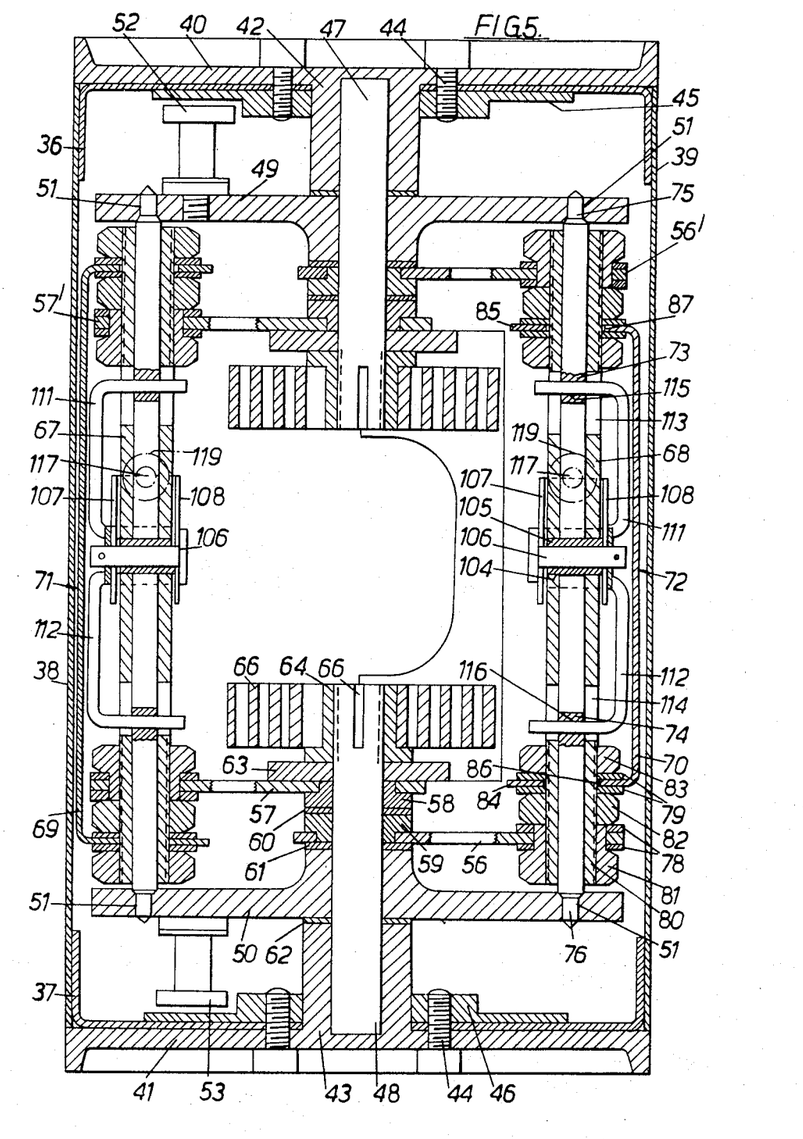
FIG. 5 is a section of the steering column taken along line 5—5 in FIG. 3.

As will be seen particularly from the sectional drawing shown in FIG. 5, the lateral cheeks 36, 37 carry a circular disc 40, 41 respectively, at their ends. These discs each carry a bearing eye or socket 42 and 43 at the center. By means of companion discs 45, 46 provided with threaded bores 44, the circular discs 40, 41 are screwed on to the cheeks 36, 37.

A stub spindle 47, 48 respectively, is pressed into each of the bearing sockets 42 and 43 of discs 40 and 41. A disc 49, 50 with apertures 51 arranged on a circular arc, is rotatably mounted on each of these stub spindles. A pin 52, 53 is screwed into each of the discs in the upper region, and a push rod 54, 55 (not shown in FIG. 5), is pivotally mounted on each pin 52, 53. The discs 49, 50 rotatably mounted on the stub spindles 47, 48 support themselves on these push rods and in this way they are secured in the housing. Pivotally mounted on each of the stub spindles 47, 48 (FIG. 5) towards the center of the assembly as shown in FIG. 5, there is a downwardly directed link 56, 56' and an upwardly directed link 57, 57' respectively. For reasons of simplification, only the bottom half of FIG. 5 will now be described, as the upper half is symmetrical with the lower half.

Pressed into the central bores of the pivotal links 56, 57, there are bushes 58, 59 between which steel washers 60, 61 are arranged for the purpose of diminishing friction. Similarly a steel washer 62 is provided between the apertured disc 50 and the bearing socket 43. Adjoining the inner link 57 is a guide bar 63 which is likewise mounted pivotally on the stub spindle 48. Next, a spiral spring 65 is arranged on a collared sleeve 64, and the inner end of the spring is passed through a slot in the sleeve 64 into an axial slot 66 of the stub spindle 48.

The outer ends of the spiral springs 65 are retained against the guide bars 63. The links 56, 57, 56', 57' extending upwards and downwards in pairs are each pivotally connected by a hollow spindle 67, 68 to push rods 69, 70 carrying the upper steering column portion 21. The double upper push rods 69 are formed by the sides of a common channel beam 71 of U-shaped cross-section. In the same way, the two corresponding lower push rods 70 are formed by the sides of a common U-section channel beam 72.

As the arrangement of the parts seated on the hollow spindles 67, 68 are the same for the upper and the lower spindles, the description hereinafter is limited to the lower spindle 68.

In the hollow spindle 68, two detent pins 73, 74 respectively, are slidably arranged in the two end sections of the hollow spindle 68. The ends 75, 76 of the detent pins 73, 74 are of reduced diameter. These ends 75, 76 engage in the apertures 51 in the disc 49, 50 and can be disengaged from their respective apertures in opposition to the resistance of a spring 77 (shown in FIG. 4). Steel discs 78, 79 are arranged on the hollow spindle 68 at both sides of the links 56, 56' and of the flanges 84, 85, of the channel beam 72. The links 56, 56' and the channel beam 72 are secured in the desired position and mutual axial spacing relative to one another by means of three nuts 81, 82, 83, in each case screwed on to a thread 80 of the hollow spindle 68. The flanges 84, 85 of the U-shaped channel beams 71, 72 are provided with bores 86, 87 by means of which the channel beams 71, 72 are mounted on the hollow spindles 67, 68.

The upper channel beam 71 and the lower channel beam 72 extend in the direction towards the steering wheel 22 and unite in a common axis formed by pins 88, 89 arranged laterally on the upper steering column portion 21, (see FIG. 4). These pins are screwed into nuts 90 which, by using a disc 92 and a flat cylindrical ring 93, are welded on to the upper steering column portion 21. Welded into each of the flanges 84, 85 of the channel beams 71, 72 are bearing rings 94 and 95 between which steel discs 96 are in turn arranged. For weight-saving reasons, these channel beams 71, 72 have large cavities (not shown) in their central area. As already mentioned, a guide bar 63 is pivotally mounted on each of the stub spindles 47 and 48. These guide bars each have a longitudinal slot 98 by means of which they are secured on the pins 88, 89 by way of ball bearings 99. During an axial displacement of the upper steering column portion 21, the pins 88, 89 move in the longitudinal slot 98. The guide bars also provide the upper steering column portion 21 with a further pin 100 which is at a distance from pins 88, 89 and likewise engages in the longitudinal slot 98 of guide bar 63. Again, at this pin, a ball bearing 101 is used for reducing friction. For reasons of stability, the two guide bars 63, just as in the case of the channel members 71, 72, are formed by the bent-over flanges of a one-piece sheet-metal pressing 102 of U-shaped cross-section. On either side of the upper portion 21, a lock nut 103 is screwed in between the guide bar 63 and nut 90 in order to secure the carrying pins 88, 89 in position on the upper portion 21.

In order that the detent pins 73, 74 arranged in the hollow spindle 68 may be operated, a pivot bolt 106 (see FIG. 5) is mounted by means of a bearing sleeve 105, in a transverse bore 104 arranged in the hollow spindle 68 at right angles to the steering column axis. A deflection plate 107, 108 is firmly connected to this bolt 106 at both sides of the hollow spindle 68. Superimposed bores 109, 110 (see FIG. 4) are provided at both sides of the pivotal axis of the deflection plates 107, 108. These bores 109, 110 are engaged by one arm in each case, of two U-shaped yokes 111, 112. The other arm of each yoke engages respectively in an elongated slot 113, 114 of the hollow spindle 68 and in a bore 115, 116 in the respective locking pins which is exposed by the elongated slot. At the side remote from the steering wheel the deflection plates 107, 108 are connected by a stay 117. Each stay is engaged by the wire 118 of a Bowden cable 119. The end of the wire 118 is secured by a clamping device 120. The extremity of the sheathing 150 of each of the two Bowden cables 119 is welded on to the corresponding hollow spindle 67, 68.

Operation of the Bowden cables 119 causes the deflection plates 107, 108 to pivot about the axis of the bolts 106, in clockwise direction, when seen from above. At the same time the yokes 111, 112 withdraw the locking pins 73, 74 from the particular bores 51 of the apertured discs 49, 50. This annuls the locking of the upper steering column portion 21 and this portion can now be axially moved in a range corresponding to twice the length of links 56, 57 and can at the same time be swivelled through a wide angular range. The smallest change in angular position of the steering wheel is determined by the spacing of the bores 51 of the apertured disc 49, 50 which are arranged at a predetermined radius.

Upon release of the Bowden cables 119, after adjustment of the upper portion 21 to find the steering wheel position most favorable for the driver, the locking pins 73, 74 snap into the opposite bores 51 of the holed discs 49, 50, or if pins and bores do not align with each other first of all, a brief re-adjustment of the position of upper portion 21 is sufficient to bring about locking.

Figures 6, 7, 8:
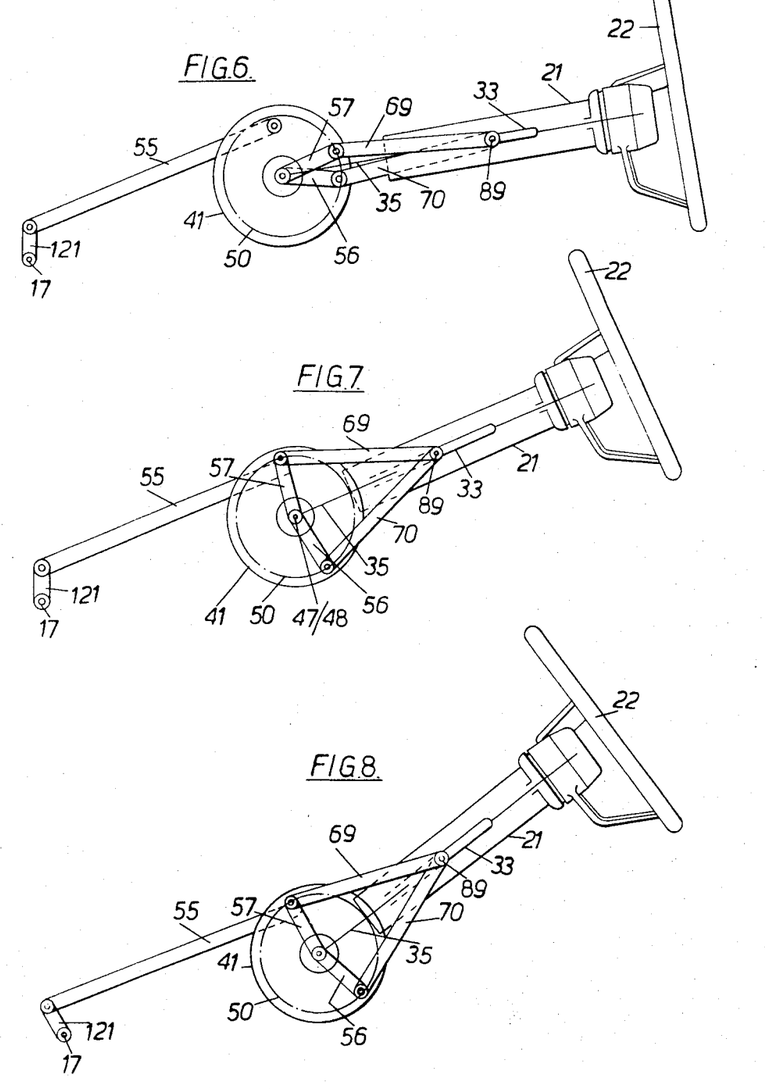
FIGS. 6, 7 and 8 are views generally similar to FIG. 2 but showing different positions of adjustment.

FIGS. 6 to 8 show a few examples of possible positions of the steering wheel. It will be clear that the links 56, 57 can be considered as cranks, and the channel beams 71, 72 can be considered as connecting rods, whereby a plurality of crank and connecting rod adjustment-linkage systems are formed. The weight of the adjustable upper steering column portion 21 is borne by a double trestle mounting formed by the channel beams 71, 72, the base of each mounting trestle being determined by the distance between the hollow spindles 67, 68 containing the locking pins. The spring 77 counteracting the unlocking operation is appropriately arranged between the deflecting plates 107, 108 and the left-hand guide bar 63.

The push rods 54, 55 supporting the apertured plates 49, 50 are pivoted at their bottom end to levers 121, 122 which are secured to the lower pivot 17 for the upswinging upper body portion 14. The push rods 54, 55 consist of a central tubular portion 123 in which, at each end, a threaded shank portion 126, 127 carrying a bearing socket 124, 125 is screwed in, and secured by a lock nut 128, 129.

With the push rod installed, rotation of the tubular portion 123 in effect shortens or lengthens the push rod, depending on the direction in which the tubular portion 123 is turned.

The levers 121, 122 the apertured discs 49, 50 acting as levers and the push rods 54, 55 connecting the two parts, form a quadrilateral linkage. When the upper body portion 14 is swung upwards, pivot 17 rotates in an anti-clockwise direction, and with it the levers 121, 122 are also swivelled in an anti-clockwise direction, as seen from the left-hand side of the vehicle. This movement is transmitted through the push rods 54, 55 to the apertured discs 49, 50. Since the upper steering column portion 21 is locked to the discs, the movement of these discs swings the column portion 21 upwards in an anti-clockwise arc (see FIG. 8).

The levers 121, 122 are each formed by two sheet-metal plates which are spaced from each other on either side of the push rods 54, 55 and are welded on to sleeves 130, 131 firmly connected to the pivot 17.

The pivot 17 for the upswinging vehicle portion 14 is mounted in ball bearings 132, 133 each of which is supported between an inner and an outer cup-shaped bearing plate 134, 135 secured to one of the lateral cheeks 36, 37 of the lower steering column portion 20, by screws 136, 137.

In order to support the lower steering shaft portion 27, a bearing 28 is secured to the cheeks 36, 37 by means of laterally arranged arms 142, 143.

A lever 144 arranged adjacent the steering wheel 22 is used to operate the Bowden cables 119. A further operating lever 145 is provided at the opposite side of the steering wheel 22 to operate the direction indicators of the vehicle. The lever 144 operating the Bowden cables 119 is rigidly connected to a stay portion 148 connecting two levers 146, 147 pivotably mounted above and below the steering column 21. The wires 118 of the Bowden cables 119 are secured to this stay portion 148 by means of clamping devices 149. In order to support and secure the sheathing 150 of the Bowden cable 119, a twin-bracket supporting member 151 is secured to the steering column 21.

In the extreme extended position of the upper steering column portion shown in FIG. 6, the links 56, 57 and the push rods 69, 70 enclose a very small angle. The apertured disc 50, itself pivotally mounted, is supported by the push rod 55 connected with the pivot 17.

By comparison with the position of the upper steering column portion 21 shown in FIG. 2, FIG. 7 shows the upper steering column portion 21 swung upwards about the stationary axis 47, 48 by a certain angular amount. At the same time the mutual position of the members of the crank and connecting rod adjustment-linkage system has remained unaltered. It is necessary in both cases to unlock the upper steering column portion 21 by withdrawing the locking pins 73, 74 from the apertured discs 49, 50 in order to adjust the upper column portion, since the apertured discs 49, 50 are secured in their position by the push rods 54, 55.

FIG. 8 shows the upper steering column portion 21 in the upswung position, without the need for the disengagement of the crank and connecting rod adjustment-linkage system from the apertured disc 49, 50. In this case, the apertured disc 49, 50 carrying the upper steering column portion 21 have been swivelled by the push rods 54, 55 which are pivoted to the levers 121, 122 secured to the pivot 17 of the upper body portion 14.

Of course, the adjustments of the steering column illustrated in FIGS. 6 and 7 may be effected simultaneously after unlocking the crank and connecting rod adjustment-linkage.

I claim:

1. An adjustable steering column for a motor vehicle, comprising a fixed lower steering column portion including a reaction member therewithin, an upper steering column portion, a horizontal transversely extending fixed pivot axis defined by said fixed lower steering column portion, means mounting said upper steering column portion for pivotal movement with respect to said reaction member about said fixed pivot axis and for displacement relative thereto in a direction radially of said axis, a two-part telescopic upper steering shaft portion, means rotatably mounting said upper steering shaft portion within said upper steering column portion, a lower steering shaft portion, means rotatably mounting said lower steering shaft portion within said lower steering column portion, articulated joint means pivotally interconnecting said upper and lower steering shaft portions for the transmission of steering torque therebetween, at least two members forming an extensible link system, means mounting said extensible link system for pivotal movement with respect to said reaction member about said fixed axis, means pivotally connecting said extensible link system to said upper steering column portion, and locking arrangement means selectively operable to lock at least one member of said extensible link system to said reaction member to thereby prevent both said pivotal movement and said displacement of the upper steering column portion with respect thereto.

2. An adjustable steering column for a motor vehicle, comprising a fixed lower steering column portion, an upper steering column portion, a horizontal transversely extending fixed pivot axis defined by said fixed lowe steering column portion, a reaction member mounted within said lower column portion for pivotal movement about said fixed pivot axis, means mounting said upper steering column portion for pivotal movement with respect to said reaction member about said fixed pivot axis and for displacement relative thereto in a direction radially of said axis, a two-part telescopic upper steering shaft portion, means rotatably mounting said upper steering shaft portion within said upper steering column portion, a lower steering shaft portion, means rotatably mounting said lower steering shaft portion within said lower steering column portion, articulated joint means pivotally interconnecting said upper and lower steering shaft portions for the transmission of steering torque therebetween, at least two members forming an extensible link system, means mounting said extensible link system for pivotal movement with respect to said reaction member about said fixed axis, means pivotally connecting said extensible link system to said upper steering column portion, locking arrangement means selectively operable to lock at least one member of said extensible link system to said reaction member, a hinged body component arranged to be opened to allow access to the interior of the vehicle, and link means operatively connected between said hinged body component and said pivotally mounted reaction member such that opening of said hinged body component produces displacement of said link means and consequent pivotal movement of said reaction member and said upper steering column portion.

3. An adjustable steering column according to claim 2, including spring means operatively connected between said fixed pivot axis and said upper steering column portion to counterbalance said upper steering column portion for pivotal movement thereof.

4. An adjustable steering column for a motor vehicle, comprising a fixed lower steering column portion including a reaction member therewithin, an upper steering column portion, a horizontal transversely extending fixed pivot axis defined by said fixed lower steering column portion, means mounting said upper steering column portion for pivotal movement with respect to said reaction member about said fixed pivot axis and for displacement relative thereto in a direction radially of said axis, a two-part telescopic upper steering shaft portion, means rotatably mounting said upper steering shaft portion within said upper steering column portion, a lower steering shaft portion, means rotatably mounting said lower steering shaft portion within said lower steering column portion, articulated joint means pivotally interconnecting said upper and lower steering shaft portions for the transmission of steering torque therebetween, at least one crank member mounted for pivotal movement about said pivot axis, at least one connecting-rod member, first means pivotally interconnecting a crank member with a respective connecting rod member, second means pivotally connecting each connecting-rod member to said upper steering column portion, said crank members and connecting-rod members and said first and second means together forming an extensible link system, and locking arrangement means selectively operable to lock at least one member of said extensible link system to said reaction member to thereby prevent both said pivotal movement and said displacement of the upper steering column portion with respect thereto.

5. An adjustable steering column according to claim 4, in which said extensible link system comprises first and second pairs of said crank members disposed on opposite sides of the steering column, with a first crank member of each pair pivotally connected to a respective portion at one end of first channel beam means constituting a first connecting-rod member as aforesaid, and with a second crank member of each pair pivotally connected to a respective portion at one end of second channel beam means constituting a second connecting-rod member as aforesaid, said first and second channel beam means being pivotally connected at their other ends to the upper steering column portion about a common horizontal transversely extending pivot axis.

6. An adjustable steering column for a motor vehicle, comprising a fixed lower steering column portion, an upper steering column portion, a horizontal transversely extending fixed pivot axis carried by said fixed lower steering column portion, means mounting said upper steering column portion for pivotal movement about said fixed pivot axis and for displacement in a direction radially of said axis, a two-part telescopic upper steering shaft portion, means rotatably mounting said upper steering column portion within said upper steering column portion, a lower steering shaft portion, means rotatably mounting said lower steering shaft portion within said lower steering column portion, articulated joint means pivotally interconnecting said upper and lower steering shaft portions for the transmission of steering torque therebetween, a pair of crank members mounted for pivotal movement about said fixed pivot axis, a pair of connecting-rod members, first means pivotally interconnecting each of said crank members to a respective one of said connecting-rod members, second means pivotally connecting each of said connecting-rod members to said upper steering column portion, said crank members and connecting-rod members and said first and second means together forming an extensible link system, a reaction member associated with said fixed pivot axis, a pair of locking pins movably mounted on respective ones of said crank members, a plurality of locking detent means formed on said reaction member, spring means biasing locking pins towards a position of locking engagement with said locking detent means for locking said crank members to said reaction member to thereby prevent both said pivotal movement and said displacement of said upper steering column portion, and a common control member selectively actuable to move both said locking pins out of engagement with said detent means into a release position permitting pivotal movement and displacement as aforesaid of said upper steering column member.

7. An adjustable steering column according to claim 6, in which said locking pins are disposed in the region of and in alignment with said first pivotal interconnecting means between said crank members and said connecting-rod members.

8. An adjustable steering column for a motor vehicle, comprising a fixed lower steering column portion, an upper steering column portion, a horizontal transversely extending fixed pivot axis carried by said fixed lower steering column portion, opposed guide bars pivotally mounted on said fixed pivot axis, pin-and-slot mounting and guide arrangements between said guide bars and said upper steering column portion, to thereby form mounting means for pivotal movement of said upper steering column portion about said fixed pivot axis and for displacement of said column portion in a direction radially of said axis, a telescopic articulated steering shaft rotatably mounted within said steering column portions, a pair of crank members mounted for pivotal movement about said fixed pivot axis, a pair of connecting-rod members, first means pivotally interconnecting each of said crank members to a respective one of said connecting-rod members, second means pivotally connecting each of said connecting-rod members to said upper steering column portion, said crank members and connecting-rod members and said first and second means together forming an extensible link system, a reaction member pivotally mounted on said fixed pivot axis, means arranged to vary the pivotal position of said reaction member with respect to said lower steering column portion about said fixed axis in response to opening of a hinged body component of the vehicle, and locking arrangement means selectively operable to lock at least one member of said extensible link system to said reaction member to thereby prevent both said pivotal movement relative to said reaction member and said displacement of the upper steering column portion.

9. An adjustable steering column according to claim 8, in which each of said pin-and-slot mounting and guide arrangements includes a pair of pins spaced along the slot, one pin of each pair forming a pivot pin of said second pivotal interconnecting means between said connecting-rod members and said upper steering column portion.

* * * * *